(12) United States Patent
Schaible

(10) Patent No.: US 6,398,202 B1
(45) Date of Patent: Jun. 4, 2002

(54) BEARING FOR A SHOCK ABSORBER STRUT OR A PNEUMATIC SPRING

(75) Inventor: Walter Schaible, Hemmingen (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 0 days.

(21) Appl. No.: 09/674,709
(22) PCT Filed: Feb. 8, 2000
(86) PCT No.: PCT/EP00/01001
§ 371 (c)(1),
(2), (4) Date: Feb. 21, 2001
(87) PCT Pub. No.: WO00/53951
PCT Pub. Date: Sep. 14, 2000

(30) Foreign Application Priority Data

Mar. 6, 1999 (DE) .......................................... 199 09 947
Dec. 15, 1999 (DE) .......................................... 199 60 457

(51) Int. Cl.[7] ............................................. B60G 13/00
(52) U.S. Cl. ........... 267/220; 188/321.11; 280/124.147; 280/124.155
(58) Field of Search ................................. 267/220, 259, 267/260; 280/124.147, 124.155, 124.109, 124.145; 188/321.11

(56) References Cited

U.S. PATENT DOCUMENTS

| 2,823,927 A | 2/1958 | Goby | 280/124 |
|---|---|---|---|
| 2,888,269 A | 5/1959 | Hogsten | 280/106.5 |
| 2,935,334 A | 5/1960 | Felts | 280/96.2 |
| 4,318,551 A * | 3/1982 | Shay et al. | 280/788 |
| 4,332,397 A | 6/1982 | Steger | 280/693 |
| 4,750,755 A * | 6/1988 | Hayashi et al. | 280/124.136 |
| 4,778,198 A * | 10/1988 | Gold | 280/124.147 |
| 4,957,307 A * | 9/1990 | Gandiglio | 280/121.141 |
| 4,974,872 A * | 12/1990 | Riese | 280/124.155 |
| 5,382,044 A * | 1/1995 | Smith et al. | 280/124.109 |
| 5,536,035 A * | 7/1996 | Bautz et al. | 280/124.139 |
| 5,560,638 A | 10/1996 | Lee | 280/690 |

FOREIGN PATENT DOCUMENTS

| DE | 32 33 878 | 3/1984 |
|---|---|---|
| DE | 39 02 407 | 5/1990 |
| DE | 44 36 599 | 4/1996 |
| DE | 196 25 106 | 1/1998 |

* cited by examiner

Primary Examiner—Pam Rodriguez
Assistant Examiner—Mariano Sy
(74) Attorney, Agent, or Firm—Crowell & Moring LLP

(57) ABSTRACT

A mounting for a shock absorber or a pneumatic spring of a wheel suspension at the body of a vehicle is supported by bearing bolts, which are held in a bearing element. The shock-absorber strut is set at an angle and, with its free upper end and with interposing the supporting element, is held in a bearing bushing, which has two bearing bolts, which lie opposite to one another on a swiveling axis and which are supported cardanically and/or pivotably in a support fastened to the vehicle. The air spring is mounted only over the bearing element, the supporting element being omitted.

17 Claims, 5 Drawing Sheets

BEARING FOR A SHOCK ABSORBER STRUT OR A PNEUMATIC SPRING

BACKGROUND AND SUMMARY OF THE INVENTION

The invention relates to a mounting for a shock-absorber strut or a pneumatic spring of a wheel suspension, mountings are disposed opposite to one another in bearing elements and the shock absorber strut is supported in the bearing element.

German Patent Documents DE 39 02 407 C1 discloses a mounting for a shock absorber of a wheel suspension at the vehicle body of a motor vehicle, which comprises bearing bolts, which are held at a fastening plate. At the same time, a wheel guiding element, which can be pivoted on the bearing bolts, is also held with the upper free end of the shock absorber. Furthermore, German Patent Document DE 196 25 106 A1 discloses a vibration damper or a suspension strut, the vibration damper of the suspension strut being fastened by means of an elastic bearing, on the one hand, at the vehicle body and, on the other, at the wheel guiding part. The upper free end of a piston rod of the vibration damper or the suspension strut is connected with a bearing element, which has radially outward protruding elastic mountings for fixing to a part of a vehicle body.

An object of the invention is to provide a mounting for an inclined shock absorber or a pneumatic spring, which ensures optimum suspension characteristics during the compression pneumatic expansion movements of the wheel and, moreover, can be combined with the body of the vehicle in a simple manner.

Pursuant to the invention, this objective is accomplished by bearing element, constructed as a bearing bushing disposed for an inclined shock-absorber strut and supported cardanically and/or pivotally over two bearing bolts lying on a common swiveling axis and wherein the bearing bushing is disposedly detached from a chassis sub-frame pivotably supporting a wheel suspension. Further advantages distinguishing features are contained in the dependent claims.

The main advantages, achieved with the invention, are that a shock absorber strut or a pneumatic spring, set at an angle to the transverse direction of the vehicle during compression and expansion movements of the wheel, can be swiveled freely or moved cardanically. For this purpose, the shock absorber is held with its free upper end in a bearing bushing, a supporting element being interposed. This bearing bushing comprises two bearing bolts, which are disposed opposite to one another on a swiveling axis and supported cardanically and/or so that they can swivel in a support fastened to the vehicle.

The constructional unit of the bearing bushing, supporting element and shock absorber forms a pre-assembled entity and can be connected in a simple manner with a cross member, fastened to the body of the vehicle. The spiral spring of the shock-absorber strut is held in the supporting element with at least one last winding fixed in an annular groove.

The supporting element is fastened in the bearing bushing between planar, corresponding connecting surfaces of the supporting element and the bearing bushing, the fastening being accomplished by bolts, rivets, gluing or a similar connection.

The bearing bushing is a pot-shaped depression, which is centrally disposed and into which a supporting bearing of the shock absorber protrudes or in which it is disposed.

According to a first embodiment, the bearing bolts of the bearing bushing are held in each case in elastic elements, which can be fixed by means of a bearing bushing to a cross member of the vehicle. For this purpose, the cross member may have semi-circular recesses, the counter-piece being a semi-circular bent clamp.

The bearing bushing is connected over bearing bolts, which are embraced in each case by a clamp, with a cross member of the vehicle body. This cross member is disposed above and detached from a chassis sub-frame accommodating the wheel suspension.

According to a further embodiment, the bearing bushing has accommodating boreholes for bearing sleeves, which are disposed opposite to one another and form a common swiveling axis, which is surrounded by an elastic sleeve element and fastened by means of a screw to the cross member. This embodiment has the significant advantage of a simple assembly and disassembly, since the horizontally supported screw bolts can be reached advantageously with one tool.

Instead of a shock-absorber strut, a pneumatic spring can also be held in the bearing bushing. In the absence of a supporting element, the pneumatic spring can be supported at and fastened directly to a cylindrical sleeve at the planar connecting surface of the bearing bushing. This connecting surface is constructed as a continuous annular surface.

Examples of the inventions are described in greater detail in the following and shown in the drawings in which

DETAILED DESCRIPTION OF THE DRAWINGS

Figure 1:
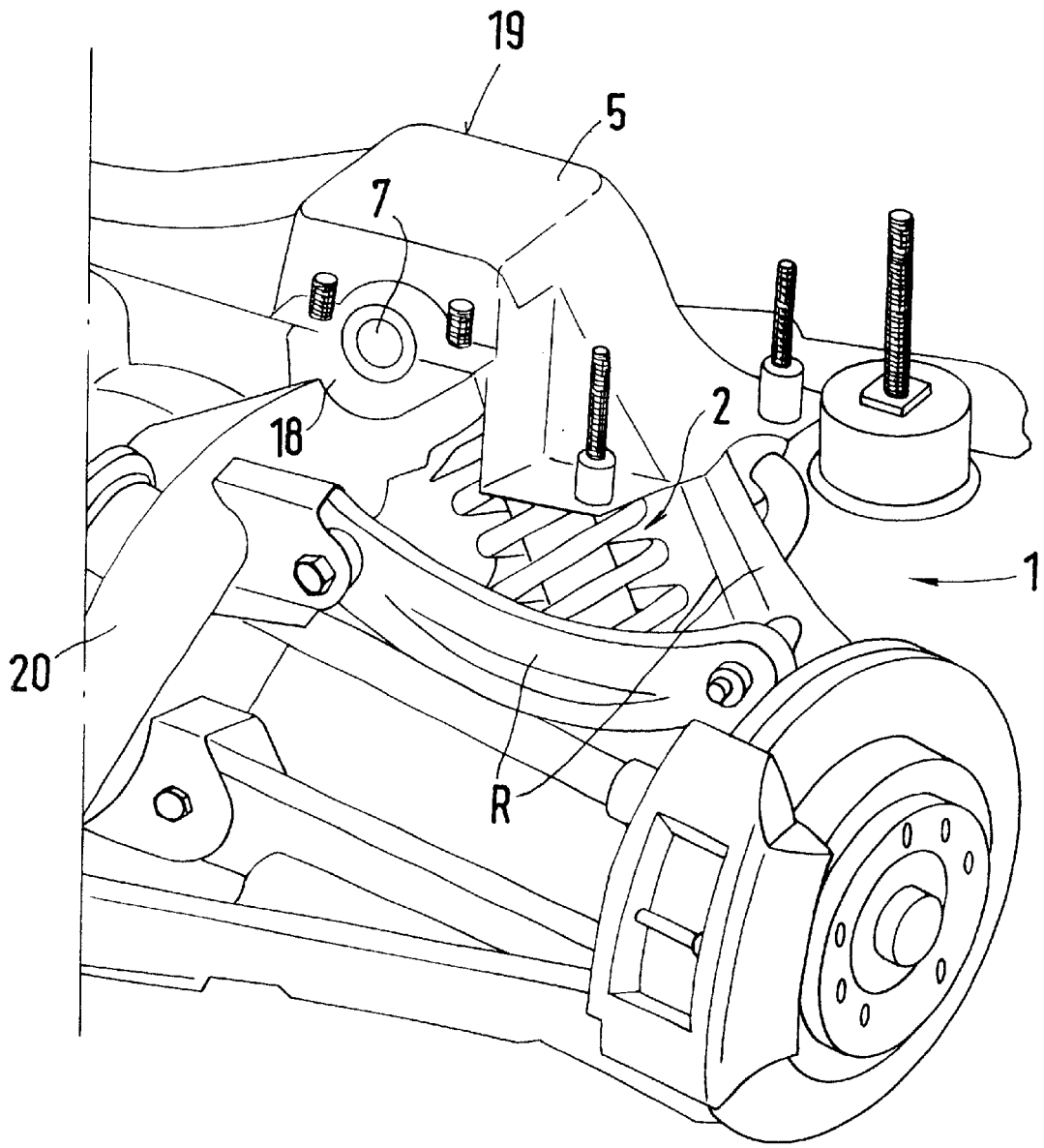
FIG. 1 shows a diagrammatic representation of a shock-absorber strut, which is set at an angle and mounted in a cross member, with a chassis sub-frame, which is disposed below.

As shown partially in FIG. 1 in a diagrammatic representation, a rear wheel suspension 1 has a shock-absorber strut 2 or a pneumatic spring L. The shock-absorber strut 2 is supported with its lower end in a wheel suspension and, with its upper free end 6, by means of a bearing bushing 3 and a supporting element 4 in a cross member 5.

As shown in FIGS. 2–6, the bearing bushing 3 preferably is constructed pot-like and, at its lower edge region has bearing bolts 7, 8, extending radially in the longitudinal direction of the vehicle. These are disposed on a common swiveling axis 9 opposite to one another.

The bearing bushing 3 preferably includes a casting and is provided with a central pot 3a, adjoining which there is a planar connecting surface 3b. A cylindrical wall 3c, which has the two bearing bolts 7, 8, is integrally molded to this connecting surface, which is constructed as an annular surface.

Within the bearing bushing 3, the supporting element 4 is disposed, which is constructed round and has a groove-shaped annular seat 10 for mounting at least one terminal winding of a spiral spring 11. The connection with the bearing bushing 3 is accomplished over the connecting surface 3b, which is disposed correspondent with a further connecting surface 4a of the supporting element 4. Fastening to the bearing bushing 3 is accomplished by means of screws, bolts, rivets, gluing or the like.

The bearing bolts 7, 8 are held in elastic elements 12, which permit a swiveling motion in the two directions 14, 15 indicated by arrows. The elastic bearings may have intermediate layers of metal. So that an optimum ability to swivel becomes possible, the bearing bolts 7, 8, according to a further inventive embodiment, could also be disposed in slide bushes.

Figure 2:
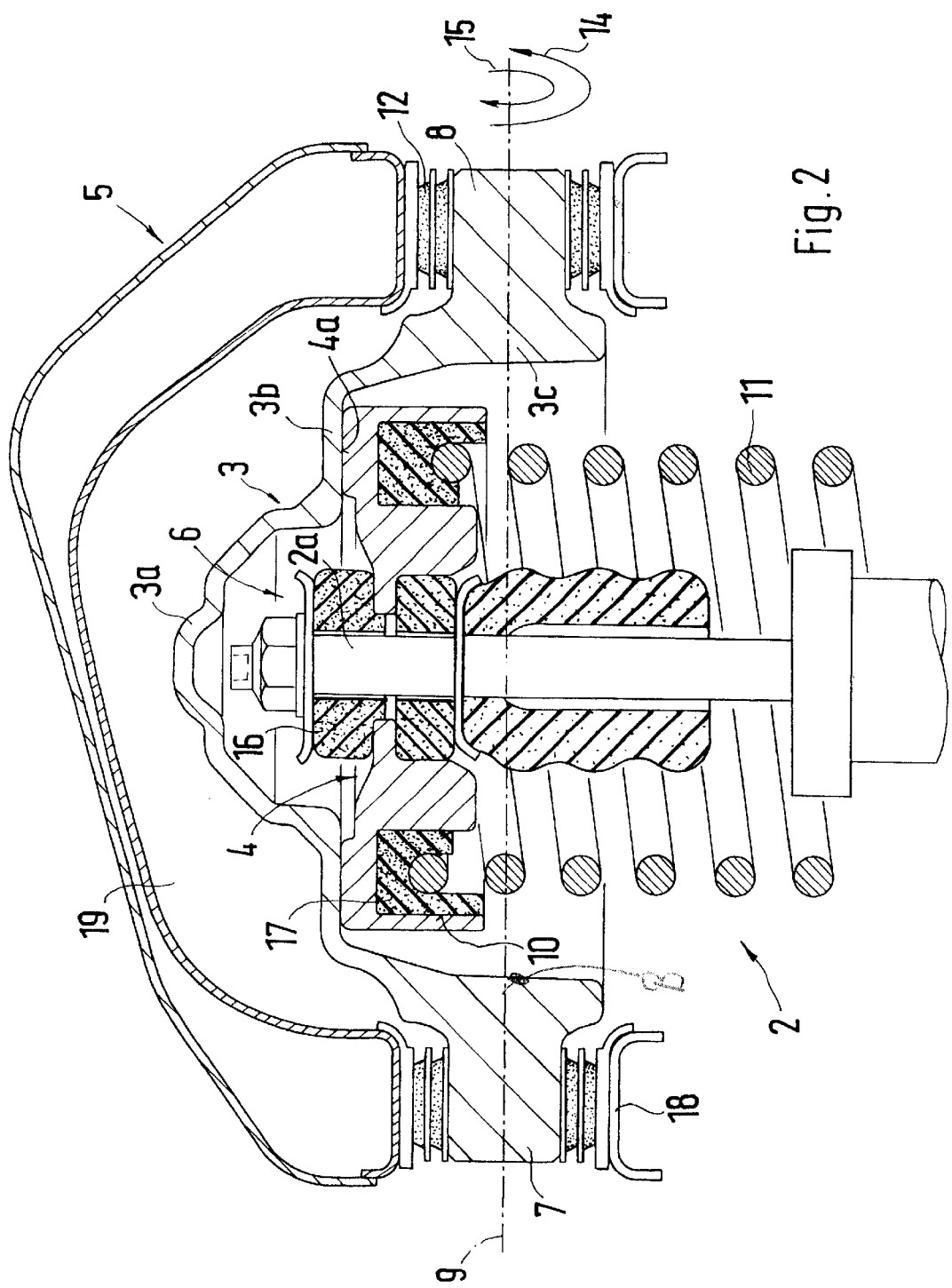
FIG. 2 shows a section through a bearing bushing with a supporting element and the shock-absorber strut held in this bearing bushing.

As shown in greater detail in FIG. 2, the free upper end 6 of the piston rod 2a of the shock-absorber strut 2 can also be held in an elastic supporting bearing 16, which is clamped into the supporting element 4. The spiral spring 11 is also held in an elastic supporting bearing 17.

The bearing bushing 3 is fastened over so-called clamps 18 at the cross member 5, which has an indentation 19 for accommodating a bearing bushing 3.

The cross member 5 preferably is constructed in the form of two shells and is disposed above a chassis sub-frame 20 and provided detached from the latter and is connected only by screws or bolts with the vehicle body or welded to the vehicle body. The shock-absorber strut 2 extends transversely between wheel control links R of an upper control plane in the direction of the central longitudinal axis of the vehicle.

According to a further embodiment of the invention, the bearing bushing 3a provided at the lower edge region with radial accommodating boreholes 31 for bearing bolts 7a and 8a, which embrace bearing sleeves 32, 33, which are surrounded by an elastic element 34, which is surrounded by an outer shell 34a. The elastic element 34, the bearing sleeve 32, 33, as well as an outer shell 34a form a structural element. This is held pressed into the borehole 31. The movements take place in the elastic element 34. For fastening the bearing bushing 3a to the cross member 5, screws 35 are used, which can be screwed into a threaded boreholes 36 of the bearing sleeves 32, 33. The bearing bolts 7a, 8a form the common swiveling axis 9 of the bearing bushing 3a.

At the upper side, the bearing bushing 3a has ribs 37 on either side, which reinforce the shell. Moreover, openings 38 may also be provided in the bearing bushing 3a; their main function is to reduce weight.

Figure 3:
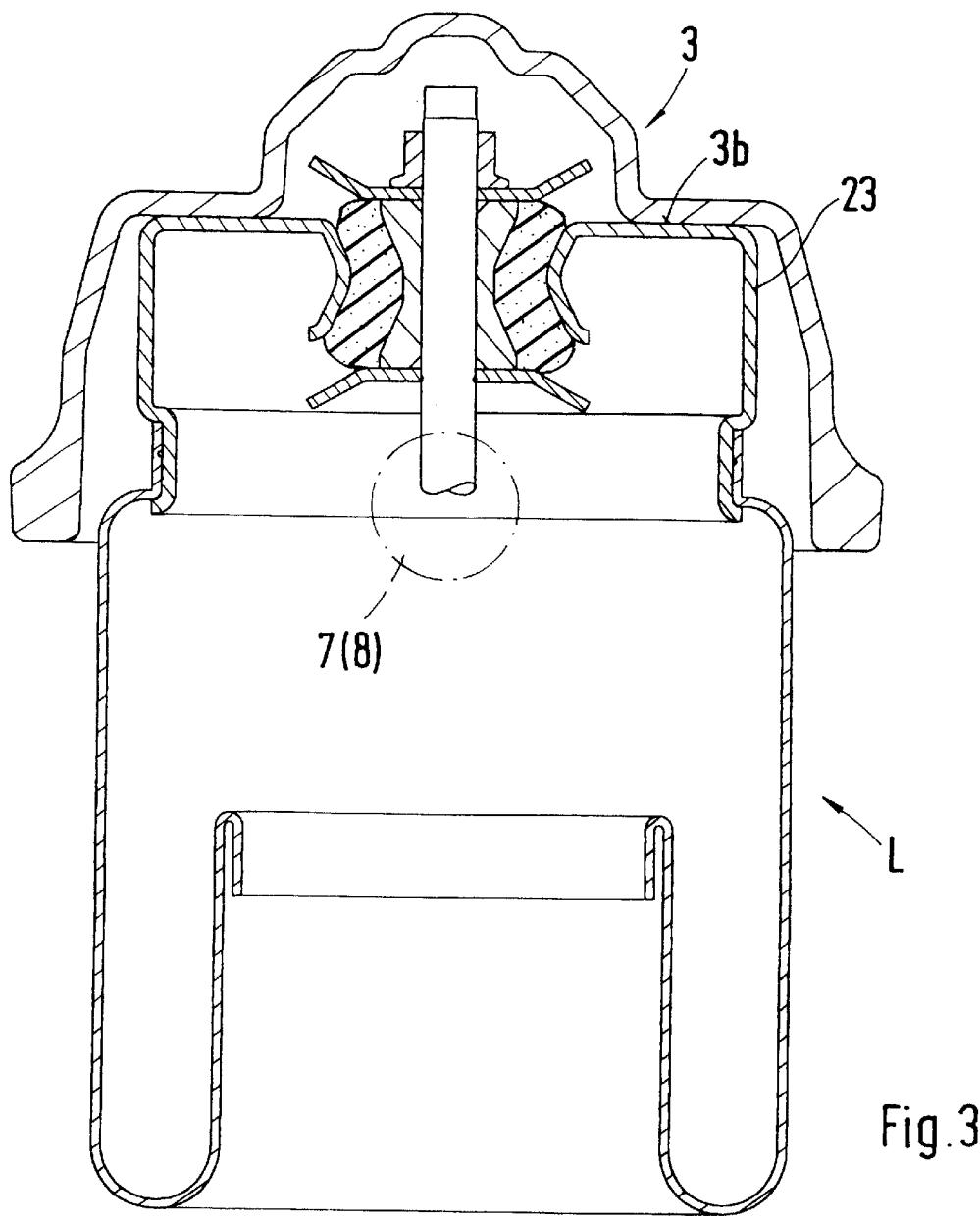
FIG. 3 shows the bearing bushing holding the pneumatic spring in section.
Figure 4:
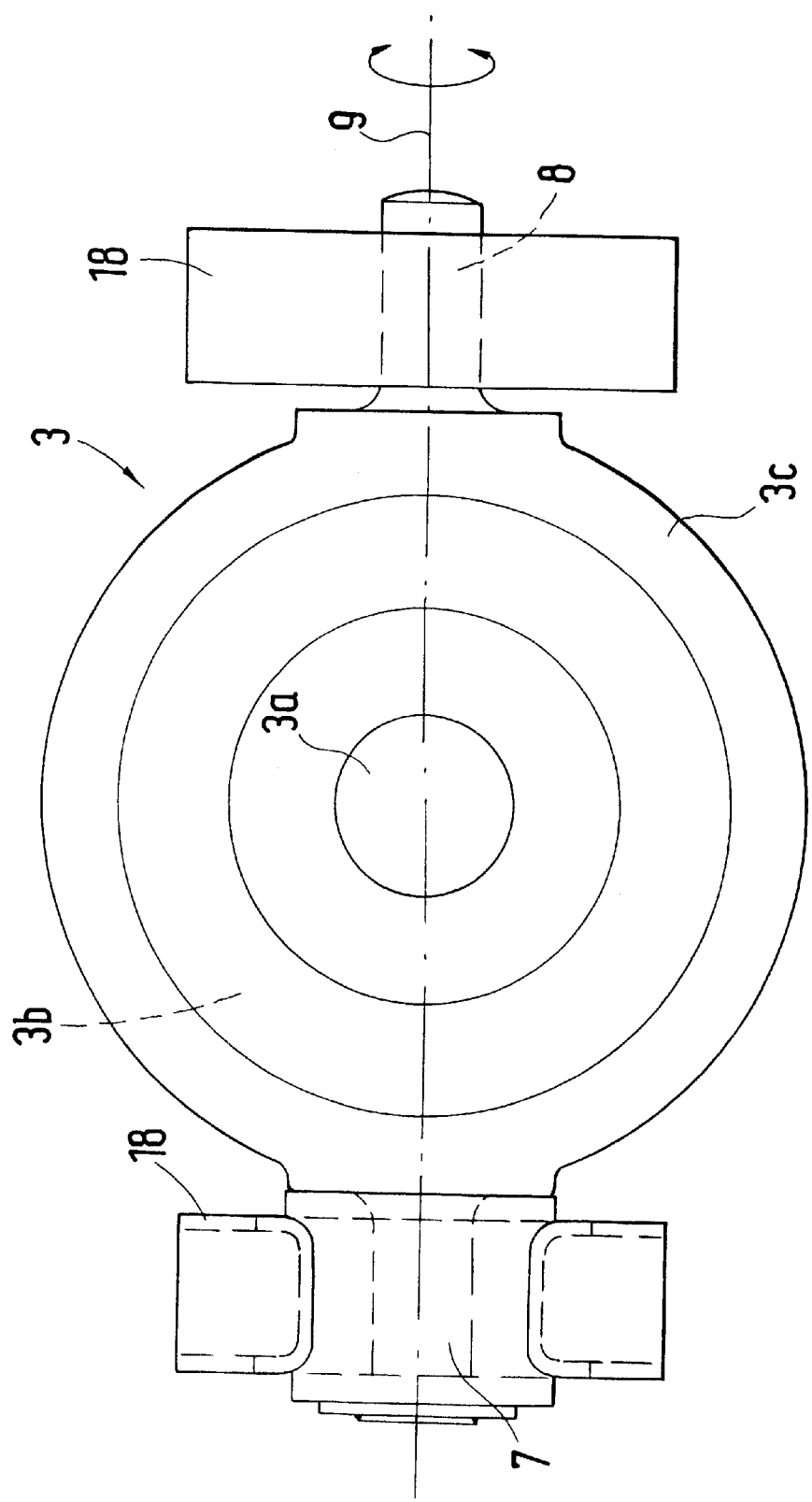
FIG. 4 shows a plan view of the bearing bushing.
Figure 5:
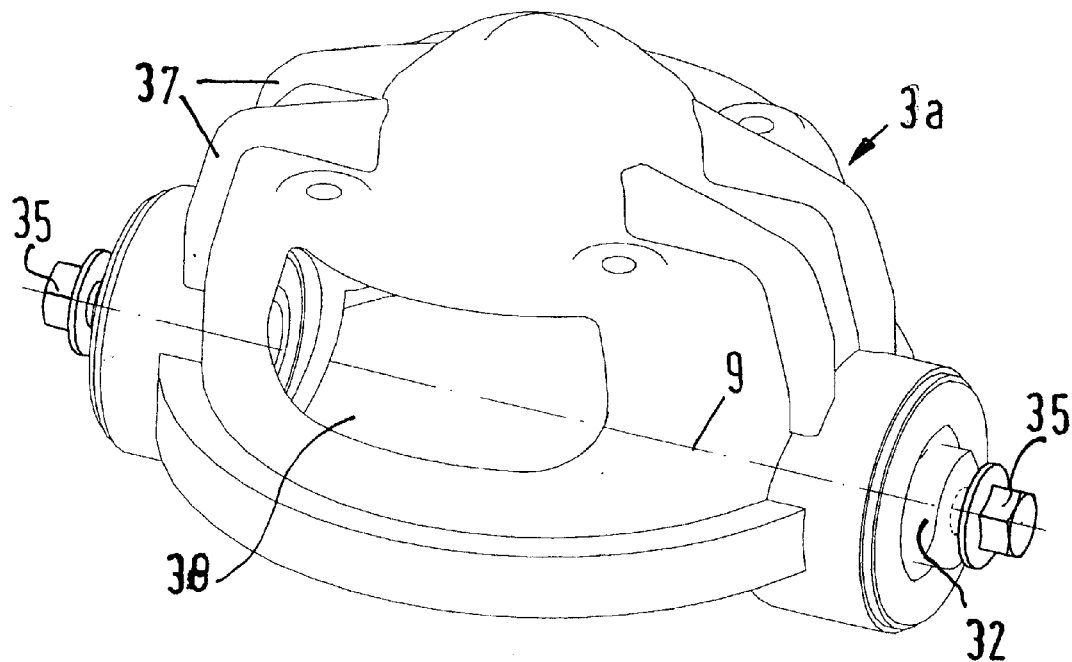
FIG. 5 shows a diagrammatic representation of the bearing bushing with the inserted bearing bolt and FIG. 6 shows a section through the bearing bushing with the inserted bearing bolt, as well as an elastic sleeve element and a bearing sleeve.
Figure 6:
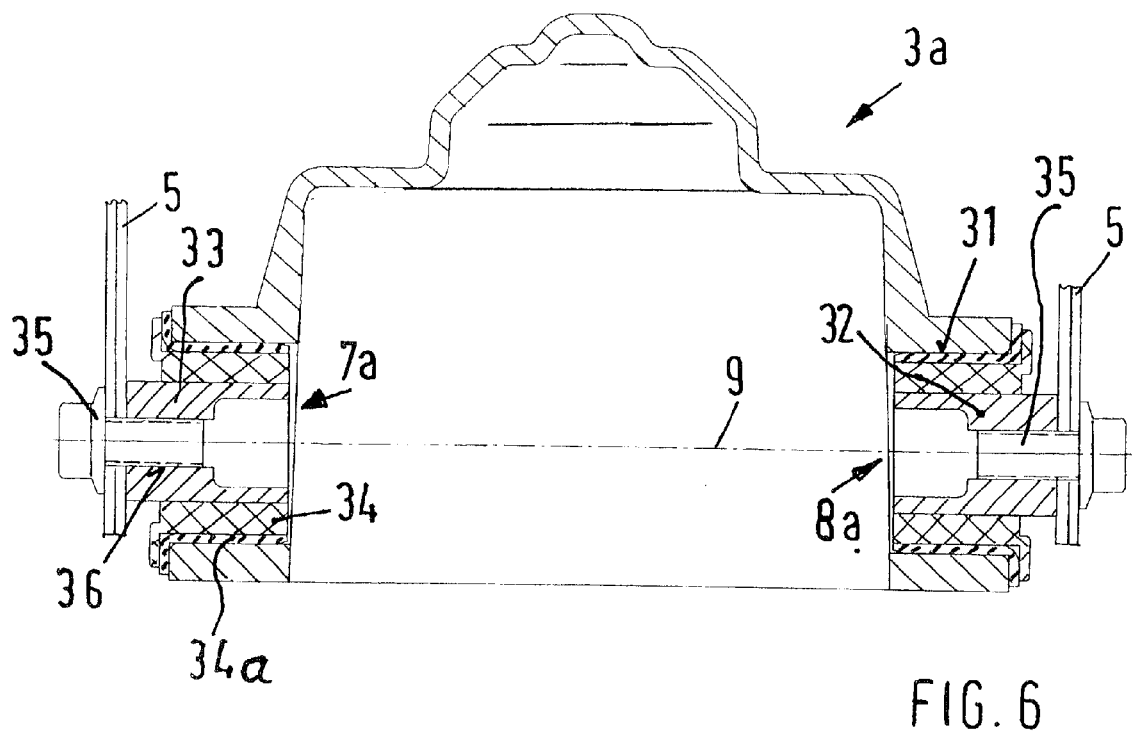

Instead of a shock absorber 2, a pneumatic spring L of FIG. 3 may also be held in the bearing bushing 3. In this case, the supporting element 4 is omitted and the pneumatic spring supports itself with a cylindrical cap 23 directly at the connecting surface 3b of the bearing bushing 3.

What is claimed is:

1. A mounting for a shock-absorber strut of a wheel suspension at a vehicle body of a motor vehicle comprising mountings, which are disposed opposite to each other in a bearing element, the shock-absorber strut being supported in the bearing element,
    wherein the bearing element is constructed as a bearing bushing, which is disposed in one cross member connected with the vehicle body, for an inclined shockabsorber strut,
    wherein said bearing element is swivelable and supported cardanically or pivotably with two bearing bolts lying on a common swiveling axis, and
    wherein the bearing bushing is separate from a chassis sub-frame pivotably supporting the wheel suspension.

2. The mounting according to claim 1, wherein the bearing bolts are integrally molded to the bearing bushing, constructed in one piece with the bearing bushing, extend from an outer edge region of the bearing bushing radially outward and are held in elastic elements.

3. The mounting according to claim 2, wherein the bearing bolts are disposed in a slide bush within the elastic elements and are held, to allow the bearing bolts to swivel.

4. The mounting according to claim 3, wherein the cross member is constructed as two shells and has semi-circular seats for the elastic elements of the bearing bolts, which are opposite to the semi-circular clamps.

5. The mounting according to claim 1,
    wherein the bearing bushing has accommodating boreholes for the two bearing bolts, which embrace a respective bearing sleeve, which are disposed opposite to each other and form a common pivoting axis, and
    wherein each of the bearing sleeves is surrounded by a respective elastic sleeve element and an outer shell and can be fastened by a screw to a cross member.

6. The mounting according to claim 5, wherein the bearing bushing has a centrally disposed, pot-shaped depression with an adjoining planar connecting surface, which is constructed as an annular surface and at which an approximately cylindrical wall adjoins, to which the bearing bolts are integrally molded, and the bearing bolts are radially protruding.

7. The mounting according to claim 5, wherein the bearing bolts are disposed in a slide bush within the elastic elements and are held, to allow the bearing bolts to swivel.

8. The mounting according to claim 1, wherein the bearing bushing has a centrally disposed, pot-shaped depression with an adjoining planar connecting surface, which is constructed as an annular surface and at which an approximately cylindrical wall adjoins, to which the bearing bolts are integrally molded, and the bearing bolts are radially protruding.

9. The mounting according to claim 8, wherein the bearing bolts of the bearing bushing in each case are held in a respective elastic element, which can be fixed by a bearing clamp to the cross member of the vehicle.

10. The mounting according to claim 1, wherein the bearing bolts of the bearing bushing in each case are held in a respective elastic element, which can be fixed by a bearing clamp to the cross member of the vehicle.

11. The mounting according to claim 10, wherein the cross member is constructed as two shells and has semi-circular seats for the elastic elements of the bearing bolts, said seats being opposite to the bearing clamps.

12. The mounting according to claim 10, wherein the bearing bolts are disposed in a slide bush within the elastic elements and are held to allow the bearing bolts to swivel.

13. A suspension for a shock-absorber strut of a wheel suspension on a body of a motor vehicle by bearing bolts, which are held in a bearing element, the shock-absorber strut being guided at an angle transversely from a wheel carrier of the wheel suspension to an upper mounting and extending between upper links of the wheel suspension towards a central longitudinal plane of the vehicle,
    wherein an elastic mounting of the shock-absorber strut includes a supporting element in a swivelable bearing bushing, which is held cardanically or pivotably in an indentation of a cross member over the bearing bolts.

14. The suspension according to claim 13, wherein the cross member is constructed as two shells and has semi-circular seats for elastic elements of the bearing bolts, said seats being opposite to bearing clamps.

15. A suspension for a pneumatic spring of a wheel suspension on a body of a motor vehicle by bearing bolts, which are held in a swivelable bearing element, wherein the pneumatic spring is set inclined at an angle and connected directly with a bearing bushing and the bearing bushing embraces the oppositely arranged bearing bolts on a common swiveling axis, and said bearing bolts are disposed cardanically or pivotably in a support, and wherein said support is fixed to the vehicle and detached from a chassis sub-frame.

16. Method of making a wheel suspension at a vehicle body of a motor vehicle comprising:

providing mountings for a shock-absorber strut disposed opposite to each other in a swivelable bearing element;

supporting the shock-absorber strut in the bearing element;

locating the bearing element, constructed as a bearing bushing, in one cross member connected with the vehicle body for the inclined shock-absorber strut; and supporting the bearing element cardanically or pivotally with two bearing bolts lying on a common swiveling axis, wherein the bearing bushing is separate from a chassis sub-frame pivotally supporting the wheel suspension.

17. A mounting for a shock absorber strut of a vehicle suspension, comprising:

a bearing element in which the strut is supported, the bearing element being constructed as a bearing bushing for the strut and being disposed in one cross member connected with a vehicle body, wherein the bearing element is swivelable by way of being supported cardanically or pivotably with two bearing bolts lying in a common swiveling axis, and wherein the bearing bushing is separate from a chassis sub-frame pivotably supporting the wheel suspension.

* * * * *